(12) United States Patent
Mecham

(10) Patent No.: US 6,923,498 B1
(45) Date of Patent: Aug. 2, 2005

(54) RECREATIONAL VEHICLE COVER

(76) Inventor: Brent Alan Mecham, 1352 So. Haight Creek Dr., Kaysville, UT (US) 84037

( * ) Notice: Subject to any disclaimer, the term of this patent is extended or adjusted under 35 U.S.C. 154(b) by 12 days.

(21) Appl. No.: 10/715,242

(22) Filed: Nov. 18, 2003

(51) Int. Cl.$^7$ .................................................. B60J 7/00
(52) U.S. Cl. ........................... 296/210; 224/328; 52/66; 296/211
(58) Field of Search ................................ 296/210, 211, 296/156, 168, 165, 163, 216.03, 172, 219, 223; 52/66; 224/328, 326, 309

(56) References Cited

U.S. PATENT DOCUMENTS

| | | | | |
|---|---|---|---|---|
| 3,485,346 A | * | 12/1969 | Ballard | ........................... 52/66 |
| 3,861,572 A | * | 1/1975 | Norris et al. | ................ 224/328 |
| 3,955,731 A | * | 5/1976 | Lindelef et al. | ............. 224/328 |
| 4,759,270 A | * | 7/1988 | Lindeen | ........................ 454/94 |
| 4,958,874 A | * | 9/1990 | Hegedus | ......................... 52/66 |
| 4,993,773 A | * | 2/1991 | Lange | ......................... 296/160 |
| 5,226,689 A | * | 7/1993 | Roe et al. | ...................... 296/159 |
| 5,303,528 A | * | 4/1994 | Simpson et al. | ................. 52/66 |
| 5,376,668 A | * | 12/1994 | Sauerberg et al. | ........... 514/340 |
| 5,406,989 A | * | 4/1995 | Abe | ................................ 141/7 |
| 5,690,376 A | * | 11/1997 | Leidal | ......................... 296/211 |
| 5,700,048 A | * | 12/1997 | Wade et al. | ................. 296/163 |
| 6,123,136 A | * | 9/2000 | Williams | ........................ 160/72 |
| 6,339,934 B1 | * | 1/2002 | Yoon et al. | .................... 62/244 |
| 6,519,900 B1 | * | 2/2003 | Pierce | ............................. 52/66 |
| 6,681,970 B2 | * | 1/2004 | Byrnes | ......................... 224/326 |
| 6,705,051 B1 | * | 3/2004 | Wall | .............................. 52/66 |
| 6,761,296 B2 | * | 7/2004 | Ford et al. | ................... 224/328 |
| 6,772,926 B2 | * | 8/2004 | Eichele et al. | .............. 224/328 |

FOREIGN PATENT DOCUMENTS

| | | | |
|---|---|---|---|
| DE | 3117820 | * | 11/1982 |
| DE | 3133195 | * | 3/1983 |
| DE | 3332060 | * | 3/1985 |
| GB | 2085815 | * | 10/1980 |
| JP | 5774210 | * | 5/1982 |
| JP | 416639 | * | 1/1992 |

* cited by examiner

Primary Examiner—Kiran Patel

(57) ABSTRACT

A recreational vehicle cover rests on the roof of a recreational vehicle. The cover is lightweight, portable and is easily installed or removed by two people. The cover requires no modification to the recreational vehicle. The recreational vehicle cover is capable of protecting the vehicle from harsh weather and heavy snow. The height of the cover above the recreational vehicle roof can be adjusted to adapt to rooftop obstructions such as air conditioner, skylights and vents and also to accommodate uneven rooflines.

11 Claims, 6 Drawing Sheets

RECREATIONAL VEHICLE COVER

BACKGROUND OF THE INVENTION

This invention applies to the field of covers for recreational vehicles. In particular, it applies to recreational vehicle covers of a rigid, yet portable nature which are capable of protecting a recreational vehicle from harsh weather and from winter snow loads. Recreational vehicles include, but are not limited to travel trailers, fifth wheel trailers, motor homes and campers. The typical recreational vehicle has a flat roof that is not intended to carry large amounts of snow. This invention provides for an additional roof above the roof on the recreational vehicle itself which is portable and lightweight and is pitched in order to be able to shed water and snow.

In the past, recreational vehicle covers which were capable of protecting the recreational vehicle from harsh weather and snow loads were typically permanent or semi permanent structures attached to real estate. Alternatively, recreational vehicle owners often had to store their recreational vehicle in sheds or garages if they wanted to protect them from adverse weather or snow. Recreational vehicle covers, which were portable, tended to be manufactured from lightweight materials such as canvas and were neither intended nor capable of carrying heavy loads.

In recent years, it has been found necessary to attach more and more fixtures and appurtenances to the roof of recreational vehicles. These include vents of various types as well as skylights, TV antennas, and air conditioning units for example. A roof cover must be able to accommodate these appurtenances and obstructions and still allow them to properly perform their intended functions. Ample airflow must also be permitted under the recreational vehicle cover to allow vents and air conditioning units to function properly. In addition, the roof cover needs to be sufficiently flexible and adjustable to allow for the many different sizes, roof shapes and types of recreational vehicles that are available.

U.S. Pat. No. 2,485,473 does show a pitched framework for a travel trailer canopy but the framework cannot be easily assembled nor disassembled because of its heavy timbers and the framework would not be easily altered to fit differing sizes and styles of travel trailers. U.S. Pat. No. 4,570,396 also shows a roof structure for a mobile home and presumably for travel trailers, but here again the roof structure is intended either as a permanent or semi-permanent structure. It uses a center support approach to create a pitch, but the system is not easily mounted or demounted. It does not provide any mechanism for varying the height of the roof cover to allow for different roof appurtenances which is a necessary feature for a recreational vehicle cover to be usable on different types and sizes of recreational vehicles.

There is therefore a need for a cover for recreational vehicles which would be capable of protecting the vehicle from harsh weather and snow and yet at the same time be easily assembled and disassembled and adjustable to fit different sizes, styles and types of recreational vehicles.

SUMMARY OF THE INVENTION

It is evident that there is a need for a cover for recreational vehicles that can be easily transported and yet, at the same time, is capable of protecting the vehicle from harsh weather and snow. It is an object of this invention to provide a recreational vehicle with a cover that is capable of protecting the recreational vehicle from such weather and from heavy snow loads while being stored or while being used at a fixed location.

It is also an object of this invention to provide a recreational vehicle cover that will be easily disassembled, transported and stored and requires no modification to the recreational vehicle. It is a further object of the invention to provide a recreational vehicle cover which is adjustable to fit various sizes of recreational vehicles and also to be adjustable to allow for various encumbrances, obstructions and uneven rooflines which may be found on the roof of modern day recreational vehicles.

In accordance with these and other objects, the present invention is directed to the features of a recreational vehicle cover for a recreational vehicle that has a roof thereon. The cover also has a rail frame, having at least two opposing side rails and two opposing end rails which demountably engage the roof of the recreational vehicle. The recreational vehicle cover has means for adjusting the height of the rail frame above the roof of the recreational vehicle as well as means for securing the rail frame to the recreational vehicle. There is also at least one pitchable roof panel frame, which is defined as a roof panel frame that can be adjusted to create a slope or pitch in order to shed water, and means are provided for demountably securing the roof panel frame to the rail frame. The recreational vehicle cover also comprises at least two roof panels with means for securing the roof panels to the roof panel frame and means for making the roof panels watertight.

These and other features, advantages and objects of the invention will become more readily understood from the following description taken in conjunction with the attached drawings wherein the numerals stated herein refer to corresponding parts identified in the drawings.

BRIEF DESCRIPTION OF THE DRAWINGS

For a better understanding of the invention, reference may be made to the following description of exemplary embodiments thereof taken in conjunction with the accompanying drawings in which.

DETAILED DESCRIPTION OF THE INVENTION

Figure 1:
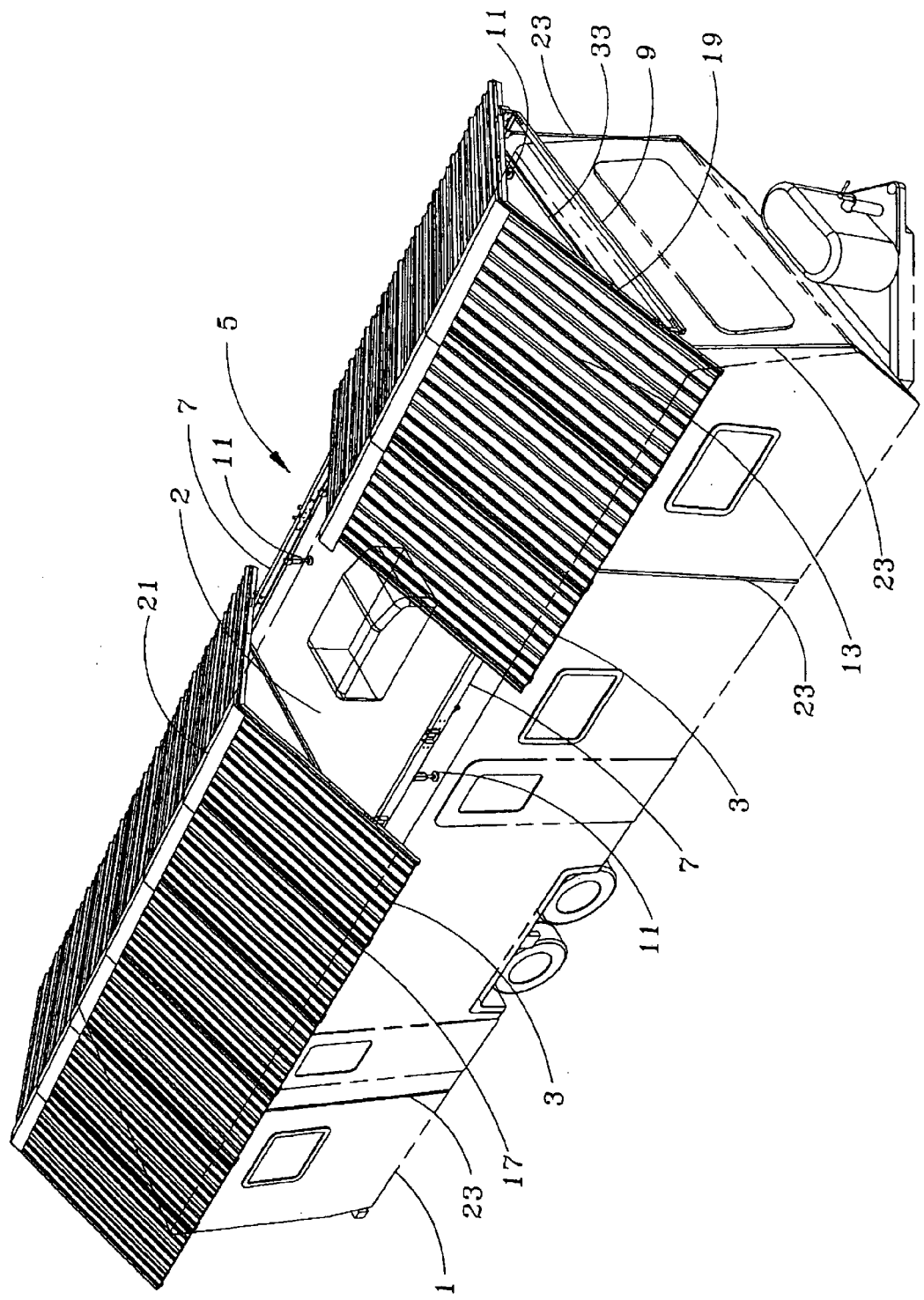
FIG. 1 is a perspective view of a recreational vehicle cover showing the recreational vehicle as well as the rail frame situated on the roof of the recreational vehicle and pitched or sloping roof panels mounted on the rail frame.

FIG. 1 is a perspective view showing a typical recreational vehicle 1 as it might look with the recreational vehicle cover of the present invention situated on the roof 2 of the recreational vehicle. Recreational vehicles of many different types will benefit from the present invention since the typical roof 2 of these vehicles are normally not designed or intended to absorb large winter snow loads. Often the standard roof is flat or only slightly pitched and owners of such vehicles frequently have to house their recreational vehicles under permanently constructed covers in order to protect them from snow and the elements. The present invention provides for a demountable cover that can easily be assembled and disassembled to provide an additional vehicle cover for harsh weather conditions and snow loads.

As is evident in FIG. 1 a rail frame 5 rests upon and engages roof 2 of recreational vehicle 1 in a demountable manner that allows for quick assembly and disassembly of the entire recreational vehicle cover. The means provided in the present invention for the engagement of rail frame 5 and roof 2 is pad foot assembly 11. The operation of pad foot assembly 11 is described in more detail below but it is important to note that pad foot assembly 11 rests on roof 2 but is not physically attached to roof 2. This facilitates the removal of the recreational vehicle cover of the present invention from the recreational vehicle in an easy and speedy manner. The entire recreational vehicle cover is secured to the roof of the recreational vehicle by its own weight and with the assistance of tie down straps 23 which are also visible in FIG. 1. Tie down straps 23 are fastened to rail frame 5 in some convenient manner and also to the frame of recreational vehicle 1. Typically more than one such tie down strap 23 would be needed to secure the recreational vehicle cover in place. Any convenient material can be used to fabricate the tie down straps 23 but in a preferred embodiment they are fabricated from a polyester material.

Rail frame 5 is assembled from side rails 7 and end rails 9. As is described in more detail below, rail frame 5 is assembled from various length sections of side rails 7 to fit the individual recreational vehicle that is to be covered. A series of locating holes on each end of end rail 9 allows adjustment of the width of rail frame 5. It can be made as long or as wide as is necessary. Roof panel frame 3 is then attached to rail frame 5 as can generally be seen in FIG. 1. The preferred method of attaching roof panel frame 3 to rail frame 5 is described in more detail elsewhere. Any standard attachment method would be satisfactory with the goal that the roof panel frame 3 can be easily mounted and demounted to facilitate ease of assembly of the entire recreational vehicle cover and ease of transportation and storage. FIG. 1 does show several sections of roof panel frame 3 secured to rail frame 5 but it should be understood that in the typical installation the entire roof 2 would be covered with such roof panel frames 3. FIG. 1 shows only a few of the roof panel frames 3 that would be necessary to completely cover roof 2 in order to also show that the roof panel frames 3 can be pitched over roof 2 in order to allow ample room for vents, air conditioning units etc. that might be located on roof 2 of a recreational vehicle. This is one of the important features of the present invention. Roof panel frame 3 utilizes hinge 33 to allow for folding and storage and ease of transport. Hinge 33 can be of any convenient type although hinges as used on folding ladders would be the preferred approach.

As is also evident from FIG. 1, roof panel frames 3 are modular in nature and are mounted side by side to cover the entire roof 2. Since roof panel frames 3 are modular, as many or as few roof panel frames 3 as are necessary can be mounted to completely cover the roof 2. Roof panel frame 3 also incorporates ridge cap 21 to cover the gap between the two folding sides of roof panel frame 3 and reduce the amount of water that can penetrate the recreational vehicle cover. Ridge cap 21 should be manufactured from a lightweight material such as sheet steel, aluminum or a rigid plastic material with sufficient strength to assist in carrying snow loads and yet at the same time assist in producing a watertight cover. Roof panels 13 are described in more detail below but it should be noted that the roof panels 13 have an overlapping section 17 that also facilitates keeping the recreational vehicle cover watertight.

Figure 2:
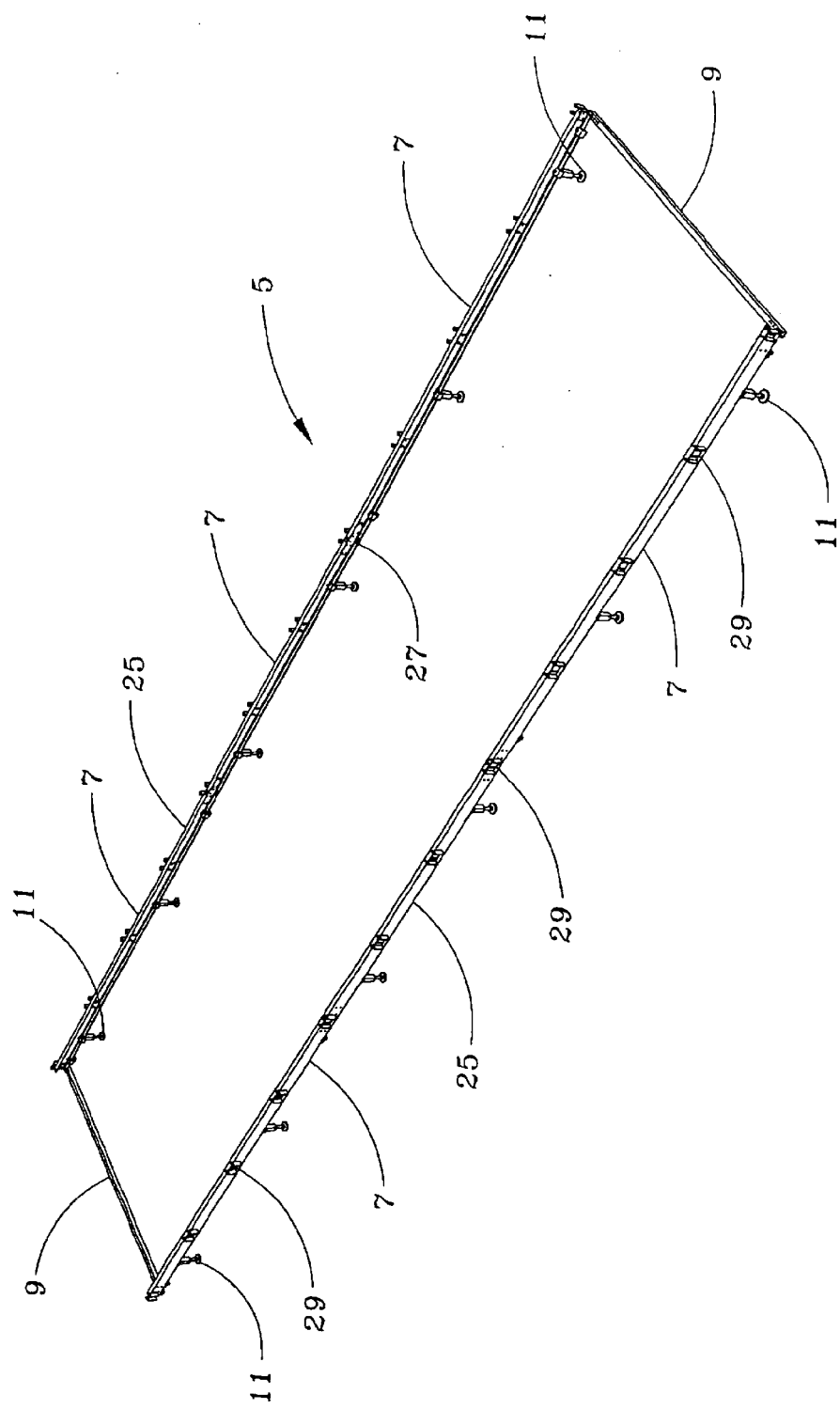
FIG. 2 is also a perspective view of the rail frame which is situated on the roof of the recreational vehicle and rests on the pad foot assemblies which are also visible in this perspective. Also shown in this view are the splice plates which are utilized to connect sections of the side rails that comprise a part of the rail frame and which permit the length of the rail frame to be adjusted to fit the recreational vehicle involved and to provide conveniently sized parts for transport and storage.

FIG. 2 shows rail frame 5 in more detail. Rail frame 5 is comprised of opposing side rails 7 and opposing end rails 9. Side rails 7 in the preferred embodiment, would be fabricated from channel aluminum 25 as can be seen in FIG. 2 and end rails 9 in the preferred embodiment, would be fabricated from aluminum tube as seen in FIG. 2. Other strong, lightweight and rigid materials would also be suitable, however. Materials such as channel aluminum 25 are particularly appropriate for the rails since brackets 29 and clamps can easily be mounted on such materials. Splice plate 27 is also visible in FIG. 2.

It is utilized to connect sections of side rail 7 together in order to fabricate a rail frame 5 of the appropriate length to fit the recreational vehicle 1. Splice plate 27 can be bolted to side rails 7 but other fastening methods can also be used. It is typically manufactured from steel but this is not required. Also visible in FIG. 2 are brackets 29 which are also capable of being bolted to side rails 7. These brackets 29 are located at various places along the side rails 7 of rail frame 5 and are used, among other things, to attach roof panel frames 3 to rail frame 5. Brackets of the type utilized in the present invention are just one of the possible means of attaching roof panel frame 3 to rail frame 5. Other brackets and other means of attaching roof panel frames 3 to rail frame 5 in a fashion that would permit adjustment and retractability would also be acceptable. In the preferred embodiment brackets 29 would be spaced approximately three (3) feet apart in order to match a three (3) foot wide roof panel frame 3 in the preferred embodiment. The width of the roof panel frames 3 and the distance between brackets 29 is not essential to the invention however. Any convenient sizes could be utilized.

Figure 3:
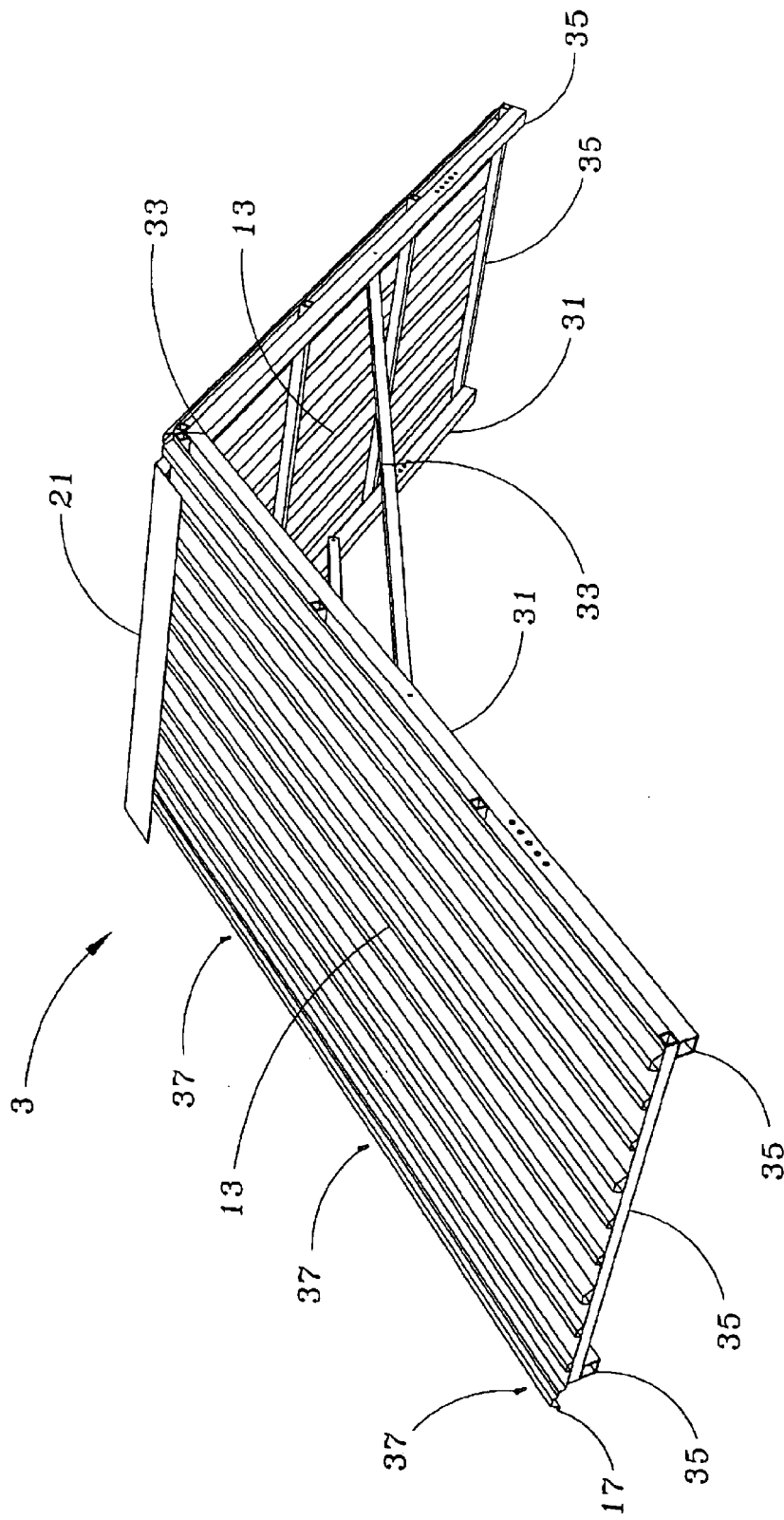
FIG. 3 is a perspective view of the roof panel frame that is attached to the rail frame. A typical roof panel mounted to the roof panel frame is shown along with a typical overlapping section of the roof panel that facilitates making the recreational vehicle cover watertight.

Turning now to FIG. 3, we have a perspective view of roof panel frame 3 together with additional detail of roof panels 13. Roof panel frame 3 is comprised of two side 31 components which together comprise roof panel frame 3. The two sides 31 of roof panel frame 3 are connected and supported by utilizing hinges 33 which allows the roof panel frame 3 to fold like a ladder and also allows roof panel frame 3 to create a pitch or slope that is referred to as being 'pitchable'. Roof panel frame 3 is fabricated from lightweight material to allow for easy transport to the top of recreational vehicle 1 by two people. In a preferred embodiment it is constructed from aluminum tubing 35. Roof panels 13 which are also visible in FIG. 3 are fabricated from a corrugated material such as a metal or rigid plastic. In a preferred embodiment they are manufactured from steel. Various means may be used to attach roof panels 13 to roof panel frame 3 and any means that would provide a secure attachment would be satisfactory. In a preferred embodiment, sheet metal screws 37 are utilized. Various means are utilized to prevent water infiltration around or through the roof panels 13. FIG. 3 shows two approaches to reducing water infiltration and other methods are also possible and would be within the scope of this invention. Use of overlapping roof panels 17 is one useful and appropriate method. Since roof panels 13 are corrugated it can be seen that one section of corrugated material can easily overlap adjoining sections to create a watertight interface. Use of a ridge cap 21 is another means of providing a watertight structure. The ridge cap 21 is angled to provide a protective surface when roof panel frame 3 is open. Ridge cap 21 also provides an overlap of the ends of the ridge caps 21 when roof panel frames 3 are mated together.

Figure 4:
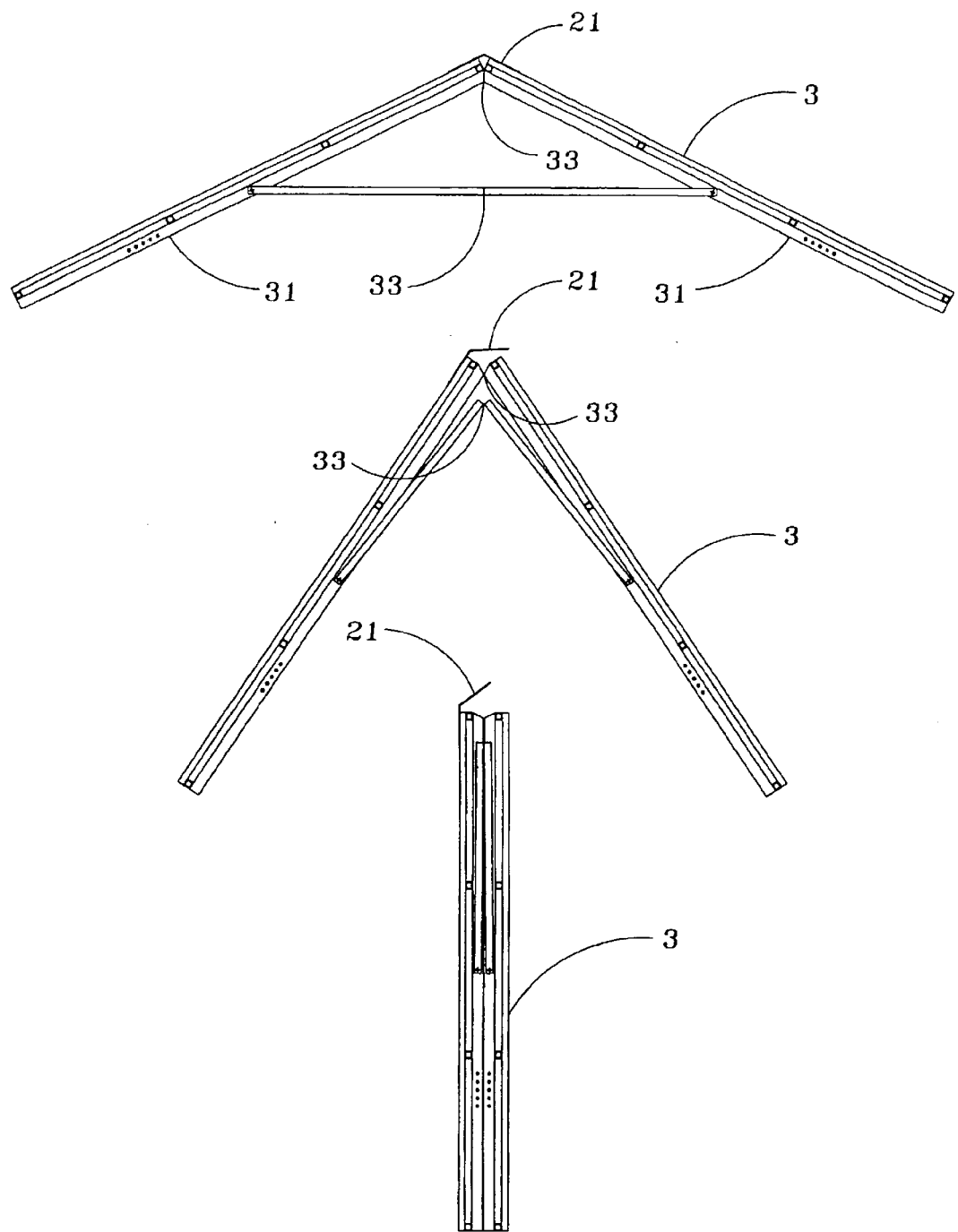
FIG. 4 shows three end views of a roof panel frame in various stages of opening and folding, and which is useful for assembling, transporting and storing the roof panel frames.

FIG. 4 presents three views of roof panel frame 3 in open, partially closed and closed positions. In the closed position, roof panel frame 3 is in position for transport and storage. In the fully open position roof panel frame 3 is shown as it would appear when attached to rail frame 5. Hinge 33 connects the two sides 31 of the roof panel frame 3 to allow the roof panel frame 3 to be opened and folded to the closed position. In addition hinge 33 is also used on support members which brace the two sides 31 and also the support members to allow them to fold when the entire roof panel frame 3 is folded and closed. Ridge cap 21 is also visible in this view. It can be seen that ridge cap 21 is physically attached to only one side of roof panel frame 3 and bridges the two sides 31 of roof panel frame 3 when opened, in order to create a watertight structure.

Figure 5:
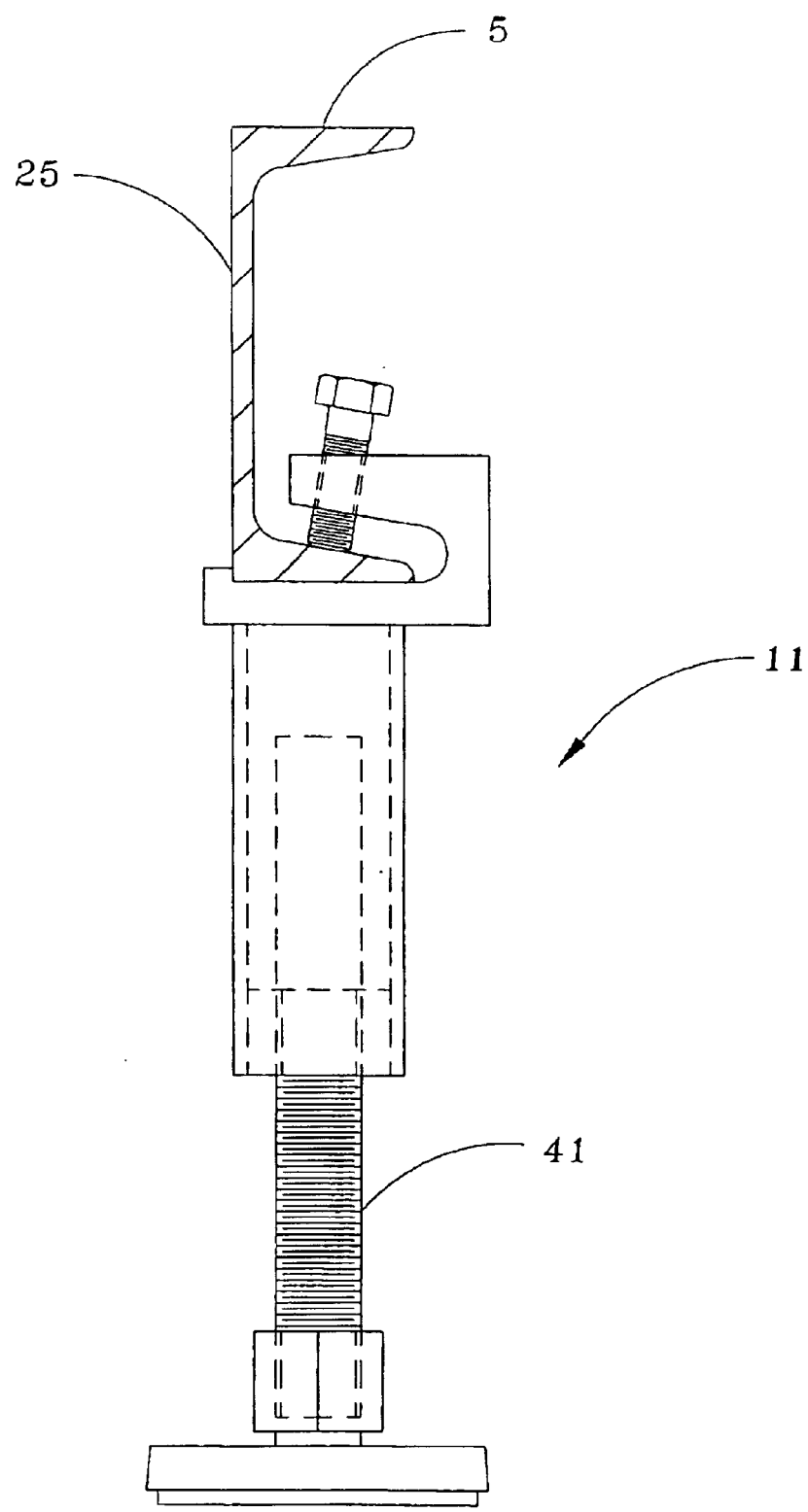
FIG. 5 shows a typical pad foot assembly as it would be attached to a section of side rail.

Turning now to FIG. 5 we have a detail of pad foot assembly 11. Pad foot assembly 11 is one means that can be used to adjust the height of rail frame 5 above the recreational vehicle roof 2. Other commercially available means would also be within the scope of this invention. It is necessary to provide for this height adjustment to allow for clearance of different appurtenances that may be located on the recreational vehicle roof 2. These can include air conditioning units, vents, skylights and other features. Since their number and size vary from recreational vehicle to recreational vehicle it is necessary to be able to adjust for the conditions that are found. It will also allow for uneven rooflines such as those found on many fifth wheel trailers. Pad foot assembly 11 is one means of doing this. When pad foot assembly 11 is used, at least four such assemblies are necessary to completely support rail frame 5. Normally they would be installed on the four corners of the rail frame 5 and additional quantities of pad foot assemblies would be used as required, spaced along side rails 7 to securely support the entire cover. They have the ability to be located at any longitudinal position along rail frame 5. FIG. 5 also shows pad foot assembly 11 as it might be attached to rail frame 5. In this case, pad foot assembly is clamped to one of the flanges of channel aluminum 25 and is a preferred embodiment. Also shown in this view is threaded rod 41 which is used to adjust the height of pad foot assembly 11. By rotating pad foot assembly 11 on threaded rod 41 the height of rail frame 5 can be adjusted upward or downward in order to clear any appurtenances found on recreational vehicle roof 2 and to level the entire rail frame 5.

Figure 6:
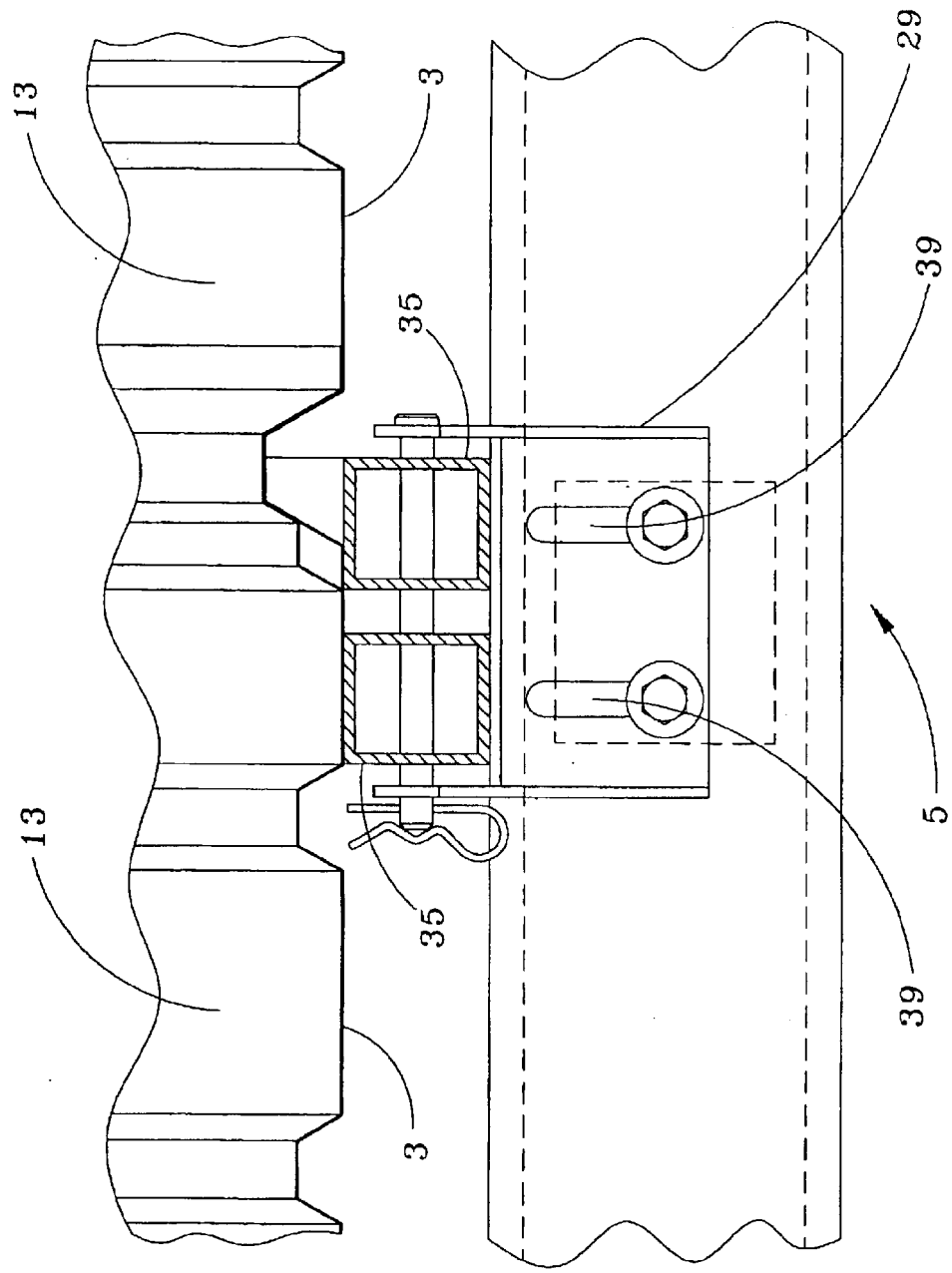
FIG. 6 shows a typical bracket utilized to attach and secure the roof panel frames to the rail frame. This view also shows the bracket slot used to permit retraction of the bracket and adjustment of the roof panel frame to fit the rail frame, and also shows a cut away view of the rail frame mounted in the bracket.

FIG. 6 shows one means of securing roof panel frame 3 to rail frame 5. In this particular embodiment, bracket 29 engages and secures aluminum tubing 35 from which roof panel frame 3 is manufactured. Bracket 29, itself, is bolted to rail frame 5 through bracket slots 39. Bracket slots 39 allow bracket 29 to slide up or down on the bolts as necessary to accommodate rail frame 5 at the proper height and also to allow retraction of bracket 29 during installation of roof panel frame 3. As can be seen in this view, aluminum tubing 35 from two adjoining sections of roof panel frame 3 are mounted side by side in bracket 29 in order to secure the roof panel frames 3 together. They can then be locked in place. In this particular embodiment, a pin is used through holes in aluminum tubing 35 to lock them together within bracket 29. The use of such a pin or other similar means allows roof panel frame 3 to be easily mounted or demounted from rail frame 5.

I claim:

1. A cover for a recreational vehicle comprising:
   a. the recreational vehicle having a roof thereon;
   b. a rail frame, having at least two opposing side rails and two opposing end rails, demountably engaging the roof of the recreational vehicle;
   c. means for adjusting the height of the rail frame above the roof of the recreational vehicle;
   d. means for securing the rail frame to the recreational vehicle;
   e. at least one pitchable roof panel frame;
   f. means for demountably securing the roof panel frame to the rail frame;
   g. at least two roof panels;
   h. means for securing the roof panels to the roof panel frame;
   i. means for making the roof panels watertight.

2. The cover of claim 1, wherein the rails are manufactured from channel aluminum.

3. The cover of claim 1, wherein the roof panel frame is hinged to permit the creation of a pitch.

4. The cover of claim 1, wherein the roof panel frame is manufactured from aluminum tubing.

5. The cover of claim 1, wherein said means for adjusting the height of the rail frame above the roof of the recreational vehicle are a plurality of pad foot assemblies.

6. The cover of claim 1, wherein said means for securing the rail frame to the recreational vehicle includes tie down straps.

7. The cover of claim 1, wherein the means for making the roof panels watertight include overlapping of the roof panels.

8. The cover of claim 1, wherein the roof panels are manufactured from corrugated material.

9. The cover of claim 1, wherein the means for securing the roof panel frame to the rail frame includes brackets mounted on the rail frame.

10. The cover of claim 1, wherein the pad foot assemblies adjust the height of the rail frame utilizing threaded rods.

11. The cover of claim 9, wherein the brackets have a slot therein to allow for adjustment of the location of the roof panel frame.

* * * * *